United States Patent
Rokhsaz

(12) United States Patent (10) Patent No.: US 7,668,238 B1
Rokhsaz (45) Date of Patent: Feb. 23, 2010

(54) METHOD AND APPARATUS FOR A HIGH SPEED DECISION FEEDBACK EQUALIZER

(75) Inventor: Shahriar Rokhsaz, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 785 days.

(21) Appl. No.: 11/299,975

(22) Filed: Dec. 12, 2005

(51) Int. Cl.
H03K 5/159 (2006.01)

(52) U.S. Cl. .................. 375/233; 333/18; 333/28 R

(58) Field of Classification Search ............ 375/229, 375/233; 708/300–323, 819; 333/18, 28
See application file for complete search history.

(56) References Cited

U.S. PATENT DOCUMENTS 6,047,026 A * 4/2000 Chao et al. ............ 375/233
2005/0180498 A1 * 8/2005 Bhakta et al. .......... 375/233
2007/0147559 A1 * 6/2007 Lapointe ............... 375/350

OTHER PUBLICATIONS

U.S. Appl. No. 10/997,159, filed Nov. 24, 2004, Anderson et al.

* cited by examiner

Primary Examiner—Shuwang Liu
Assistant Examiner—David Huang
(74) Attorney, Agent, or Firm—Michael T. Wallace

(57) ABSTRACT

A method and apparatus for advantageously utilizing the reset state of an RTZ shift register to guarantee proper data alignment at the feedback taps to facilitate decision feedback equalization (DFE). An input data stream (DATA) is sliced into an even data stream and an odd data stream. Each bit of the even data stream is propagated through RTZ latches and each bit of the odd data stream is propagated through RTZ latches. At any given instant in time, half of the RTZ latch outputs contain zero information, so that each latch output may be summed in a current mode without the need for any intervening logic. The input data stream is then summed in current mode with the feedback data and converted to voltage prior to sampling of the currently received data bit.

20 Claims, 7 Drawing Sheets

METHOD AND APPARATUS FOR A HIGH SPEED DECISION FEEDBACK EQUALIZER

FIELD OF THE INVENTION

The present invention generally relates to decision feedback equalizers (DFE), and more particularly to high speed decision feedback equalizers.

BACKGROUND

Communication developments in the last decade have demonstrated what seems to be a migration from parallel data input/output (I/O) interface implementations to a preference for serial data I/O interfaces. Some of the motivations for preferring serial I/O over parallel I/O include reduced system costs through reduction in pin count, simplified system designs, and scalability to meet the ever increasing bandwidth requirements of today's communication needs. Serial I/O solutions will most probably be deployed in nearly every electronic product imaginable, including IC-to-IC interfacing, backplane connectivity, and box-to-box communications.

Although the need for increased communication bandwidth continues to drive future designs, support for the lower bandwidth legacy systems still remains. As such, the future designs are required to provide a wide range of scalability, whereby data rate, slew rate, and many other physical (PHY) layer attributes are adaptable. For example, a particular transmitter/receiver pair may be configured for use as both a high-definition serial digital interface (HD-SDI) and a standard-definition serial digital interface (SD-SDI). Both standards have similar specifications, but differ from each other at the PHY layer with respect to, for example, bit rate and edge rate. The same transmitter/receiver pair, however, may nevertheless be required to meet both specifications.

Added to the complexity of adapting today's communication systems to the plethora of communication protocols that are available, is the challenging task of mitigating the channel effects that are imposed upon the transmitted signal, such as intersymbol interference (ISI). Conventional techniques used to mitigate these ISI effects include the use of a decision feedback equalizer (DFE), which utilizes information obtained from previously received data bits to correct the currently received data bit.

In a typical DFE application, for example, a serial data path is sampled by a plurality of master-slave latches, whereby during the first half cycle, data bits are sampled, and during the second half cycle, data bits are stored. The stored data bits are then fedback to various taps of a summing junction, which adds or subtracts a scaled value of the stored data bits to the currently received data bit. As such, ISI caused by previously received data bits may be substantially subtracted from the currently received data bit.

As the data rate increases, however, the cycle time, or unit interval (UI), of each data bit shrinks, effectively decreasing the amount of time that is available to perform the DFE function. Efforts continue, therefore, to reduce the delay of the feedback loop, so that proper DFE operation may be sustained despite the ever decreasing UI time allocation.

SUMMARY

To overcome limitations in the prior art, and to overcome other limitations that will become apparent upon reading and understanding the present specification, various embodiments of the present invention disclose an apparatus and method for leveraging the memoryless attributes of a return to zero (RTZ) latch to provide real time updates to the feedback taps of a decision feedback equalizer (DFE). By utilizing the reset attributes of the RTZ latches, some or all feedback connections may be brought directly to the feedback taps, with no intervening logic, to facilitate a low delay, fast DFE with inherent parallel to serial conversion of the feedback taps.

In accordance with one embodiment of the invention, a method of performing decision feedback equalization (DFE) of a currently received data bit comprises slicing an input data stream into first and second data streams using first and second shift registers, shifting the first data stream through first and second sets of latches of the first shift register. The first set of latches are activated during a time period and the second set of latches are reset during the time period. The method further comprises shifting the second data stream through third and fourth sets of latches of the second shift register. The third set of latches are reset during the time period and the fourth set of latches are activated during the time period. The method further comprises summing outputs of the first, second, third, and fourth sets of latches with the currently received data bit during the time period. The activated latches provide a number of consecutively received data bits prior to the currently received data bit for summation during the time period. In one aspect of the invention the first data stream is an even data stream and the second data stream is an odd data stream. In another aspect of the invention the first data stream is an odd data stream and the second data stream is an even data stream.

In accordance with another embodiment of the invention, a decision feedback equalizer (DFE) comprises a first shift register that is coupled to receive an input data stream and is coupled to provide a first portion of previously received data bits. A first group of data bits of the first portion are activated and a second group of data bits of the first portion are reset. The DFE further comprises a second shift register that is coupled to receive the input data stream and is coupled to provide a second portion of the previously received data bits. A third group of data bits of the second portion are activated and a fourth group of data bits of the second portion are reset. The DFE further comprises a summation block that is coupled to receive the input data stream and is coupled to the first and second shift registers and is adapted to sum a currently received data bit of the input data stream with the first and second portions of the previously received data bits. The summation block is adapted to combine the activated and the reset groups of data bits to form a group of consecutive data bits received prior to the currently received data bit.

In accordance with another embodiment of the invention, a method of performing decision feedback equalization (DFE) comprises propagating a first portion of input data bits through a first plurality of latches, propagating a second portion of the input data bits through a second plurality of latches, resetting a first group of the first and second plurality of latches during a time period, activating a second group of the first and second plurality of latches during the time period, combining all outputs of the first and second groups of latches during the time period, and summing a currently received input data bit with the combined outputs during the time period to equalize the currently received input data bit.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to decision feedback equalizers (DFEs) that substantially decrease the feedback delay required to remove post-cursor information from the incoming signal. Return to zero (RTZ) latches are utilized to slice an incoming full-rate data stream into two, half-rate data streams. Data bits from a number of series connected RTZ latches in each half-rate data path are then fedback to a summing node, where correction of the present cursor is performed at the full rate using the post-cursor information contained in the feedback signals.

In particular, the set/reset operation of the RTZ latch is advantageously utilized to provide the correct feedback information to the summer for correction of the current cursor at the full rate. That is to say, for example, that the DFE feedback taps are configured to receive data bits from each RTZ latch of each half-rate data path simultaneously. By operation of the RTZ latches, however, half of the feedback data is in a reset, or zero information state, while the other half of the feedback data is in an active state. Accordingly, the correct feedback data is guaranteed to exist at the summing node of the DFE to correct the currently received data bit.

Furthermore, the correction is applied at the full rate, such that DFE operation is accomplished within a single UI. In particular, current mode mixing is applied at the summing node, whereby each feedback tap is appropriately weighted and steered in current mode to reduce the delay required to subtract the ISI from each data bit received. Thus, while the feedback taps are updated at half-rate, the DFE nevertheless operates at full-rate through efficient use of the RTZ phase and current steering topology.

Figure 1:
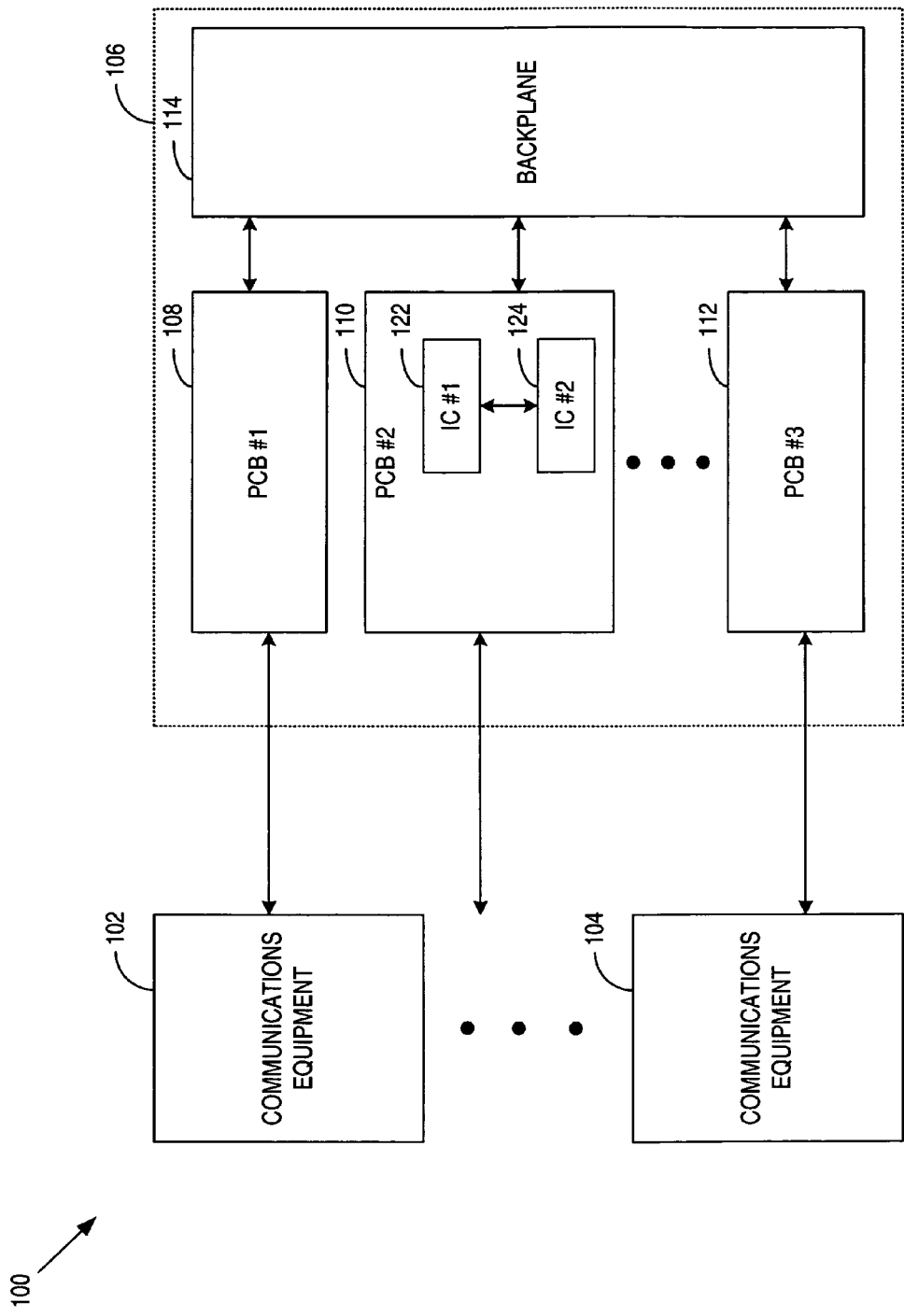
FIG. 1 illustrates an exemplary communication system.

Application of the RTZ latch enabled DFE is virtually unlimited and may be utilized with any communication protocol that requires high speed DFE operation, such as is exemplified by communication system 100 of FIG. 1. Communications equipment blocks 102-106 may represent communicating entities, in which communication takes place at various levels and distances using various wired and/or wireless technologies.

Communications equipment blocks 102-104, for example, may communicate with communications block 106 via a Local Area Network (LAN) or Storage Network (SN) using technologies such as 1 Gigabit Ethernet, or 10 Gigabit Ethernet, as specified by IEEE 802.3. Alternately, communication system 100 may represent a data center, a storage network, or a System Area Network (SAN), for example, in which the Infiniband serial I/O interconnect architecture, or Fiber Channel, is utilized. Conversely, communication system 100 may represent a Synchronous Optical NETwork (SONET) or Synchronous Digital Hierarchy (SDH) employed by many Internet Service Providers (ISPs) and other high bandwidth end users.

Still other communication technologies supported by communication system 100 may include Peripheral Component Interconnect (PCI), PCI-Express, RapidIO, and Serial Advanced Technology Attachment (ATA). Such communication standards may be implemented, for example, to support serial communications between Printed Circuit Boards (PCBs) 108-112, ICs 122-124, and backplane 114. In one embodiment, ICs 122-124 may represent programmable logic devices, such as field programmable gate arrays (FPGAs), which may be configured and adapted to provide communication support to the various communication protocols as discussed above.

Figure 2:
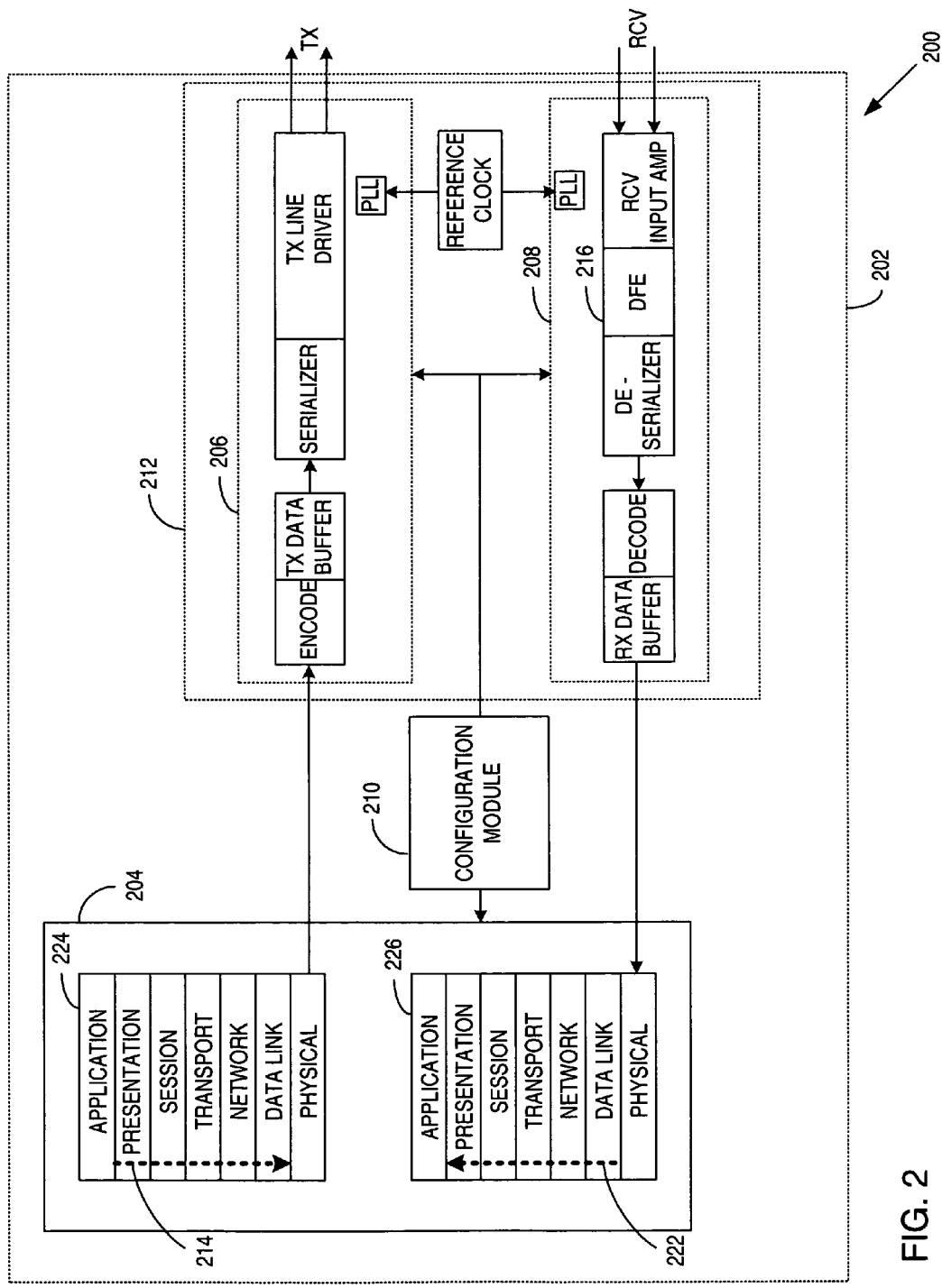
FIG. 2 illustrates an exemplary application of a high speed decision feedback equalizer (DFE)

Turning to FIG. 2, an exemplary block diagram 200 is illustrated in which integrated circuit (IC) 202 conducts serial communications with external communications equipment (not shown). In one embodiment, IC 202 may represent an FPGA, whereby configurable logic portion, i.e., fabric 204, and related processor supported functions are used to implement communication stacks 224 and 226 in support of the various communication protocols discussed above.

Using such an arrangement, data frames outbound from FPGA fabric 204 may propagate from, for example, the application layer to the physical layer of communication stack 224 via communication path 214. Similarly, data frames inbound to FPGA fabric 204 may propagate from, for example, the physical layer to the application layer of communication stack 226 via communication path 222.

Multi-gigabit transceiver (MGT) 212 implements the physical media attachment (PMA) and the physical coding sublayer (PCS) via transmitter 206 and receiver 208. Included with the PMA function, for example, are the serializer/deserializer (SERDES), the transmit line driver, the receiver input amplifier, clock generation and clock and data recovery (CDR) portions of MGT 212. While two phase locked loops (PLLs) are shown, a single PLL may be used for both receiver 206 and transmitter 208.

DFE 216, as discussed in more detail below, accepts serial data at the full-rate and provides tap information to the CDR portion of the deserializer. In addition, DFE 216 provides feedback tap information to a summing node within DFE 216 so that ISI due to previously received bits through a band-limited medium may be substantially reduced.

Included with the PCS function, is the encoding/decoding function where, for example, 8B/10B or 64B/66B encoding/decoding is performed. The PCS function may also perform scrambling/descrambling functions and elastic buffering in support of channel bonding and clock correction. In support of the configuration and/or partial reconfiguration of FPGA fabric 204 and MGT 212 is configuration module 210, which may provide an on-board microprocessor, to further enable communication protocol support as well as maintenance functionality.

Figure 3:
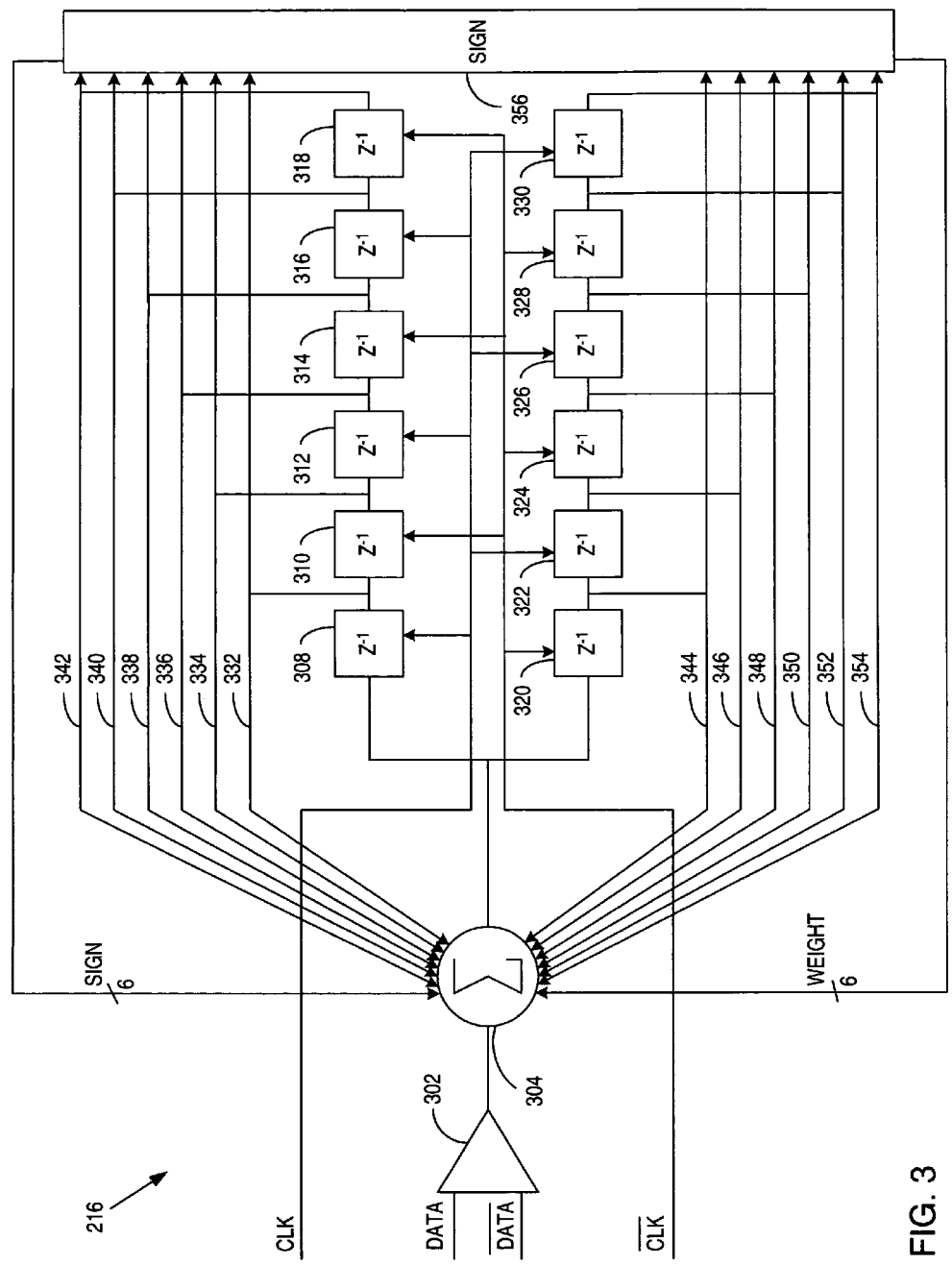
FIG. 3 illustrates an exemplary block diagram of the high speed DFE of FIG. 2.

Turning to FIG. 3, an exemplary block diagram of DFE 216 of FIG. 2 is illustrated. Amplifier 302 receives differential signal, DATA and $\overline{\text{DATA}}$, operating at a full-rate of up to 12.5 giga-bits per second (Gbps), for example. The output of amplifier 302 is coupled to summer 304, which combines the output of amplifier 302 with feedback taps 332-354 to provide DFE corrected data at the output of summer 304.

Delay stages 308-318 represents an RTZ shift register that receives the full-rate data signal and samples the full-rate data signal at the rising edge of signal CLK or $\overline{\text{CLK}}$. In particular, it is noted that RTZ latches 308, 312, and 316, for example, latch their respective data at the rising edge of signal CLK, whereas RTZ latches 310, 314, and 318 latch their respective data at the rising edge of signal $\overline{\text{CLK}}$. The sampled, or sliced, data is then propagated throughout RTZ latches 308-318 to provide progressively delayed taps at half the full data rate.

Delay stages 320-330 also represents an RTZ register that receives the full-rate data signal and samples the full-rate data signal at the rising edge of signal CLK or $\overline{\text{CLK}}$. In particular, it is noted that RTZ latches 320, 324, and 328, for example, latch their respective data at the rising edge of signal $\overline{\text{CLK}}$, whereas RTZ latches 322, 326, and 330 latch their respective data at the rising edge of signal CLK. The sampled data is then propagated throughout RTZ latches 320-330 to provide progressively delayed taps at half the full data rate.

Thus, RTZ latches 308-318 capture every other full rate data bit, e.g., the even-numbered data bits, hold the data for the first half of the sampling clock cycle and reset their output during the second half of the sampling clock cycle. Similarly, RTZ latches 320-330 capture every other data bit, e.g., the odd-numbered data bits, hold the data for the first half of the sampling clock cycle and reset their output during the second half of the sampling clock cycle. Optimally, the data bits sampled by RTZ latches 308-330 are sampled at the bit center of each data bit.

In operation, RTZ latches 308-330 implement a shift register function, whereby each RTZ latch output reflects a delayed output of the preceding RTZ latch output, where the duration of the activated output of each RTZ latch is equal to one unit interval (UI), or one half cycle of signal CLK. As discussed in more detail below, through operation of the set/reset aspects of the RTZ shift registers, timing of the feedback data delivered to summer 304 is guaranteed to allow proper DFE correction of the currently received bit. In other words, prior to sampling of the currently received data bit, data relating to a predetermined number of previously received data bits is properly signed and combined with the current data bit, so as to substantially remove/minimize any ISI effects caused by the predetermined number of previously received data bits.

Feedback data 332-354 are also provided to the clock and data recovery portion of receiver 208 of FIG. 2, so that proper timing may be achieved to perform the de-serializing function. SIGN block 356 also receives feedback data 332-354, which uses an adaptive least mean square (LMS) algorithm to properly sign and weight each feedback tap by providing signals $\text{SIGN}_0\text{-SIGN}_5$ and $\text{WEIGHT}_0\text{-WEIGHT}_5$ to summing block 304 in response to feedback data 332-354. Once properly signed and weighted, information provided by feedback data 332-354 is then used to substantially reduce ISI relating to the currently received data bit. It should be noted, that amplifier 302 and summer 304 may be completely incorporated into a single device as discussed in more detail below.

Figure 4:
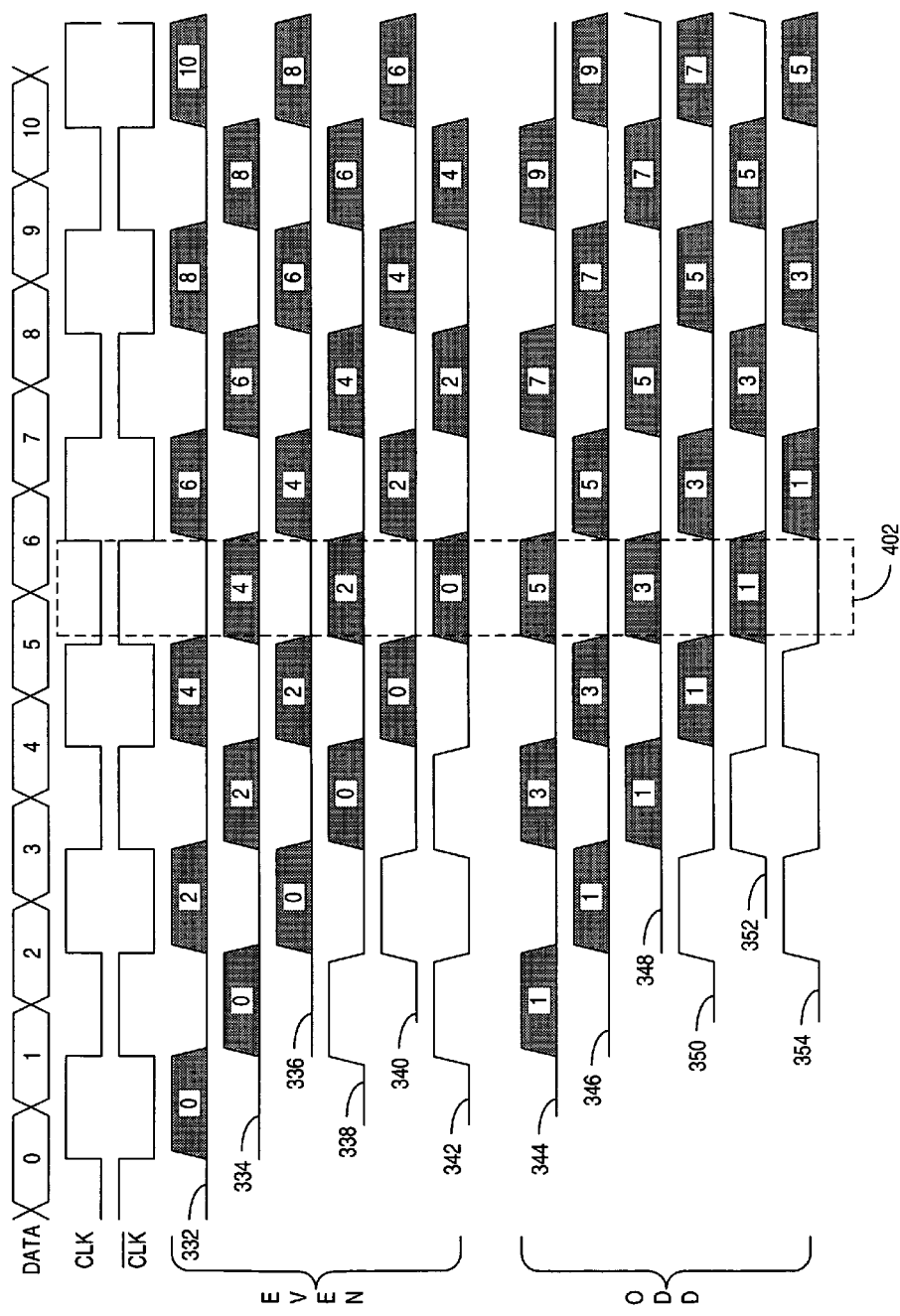
FIG. 4 illustrates an exemplary timing diagram of the feedback data of FIG. 3.

Turning to FIG. 4, a timing diagram is illustrated, which exemplifies the set/reset timing relationship regarding the RTZ shift registers of FIG. 3 and the data that is available at the output of the RTZ latches 308-330 at, or prior, to each sampling time. Signal DATA represents the full-rate data stream as received by amplifier 302 and signals CLK and $\overline{\text{CLK}}$ represent the clock signals as received by the corresponding RTZ latch 308-330. Data streams 332-354 represent the outputs of RTZ latches 308-330, respectively, where data streams 332-342 may be characterized as "even" data and data streams 344-354 may be characterized as "odd" data.

It can be seen by inspection that the even data stream is sampled by RTZ latches 308, 312, and 316 at the rising edge of signal CLK; also the even data stream is sampled by RTZ latches 310, 314, and 318 at the rising edge of signal $\overline{\text{CLK}}$. Similarly, the odd data stream is sampled by RTZ latches 320, 324, and 328 at the rising edge of signal $\overline{\text{CLK}}$; also the odd data stream is sampled by RTZ latches 322, 326, and 330 at the rising edge of signal CLK.

Also seen by inspection, is the set/reset attribute that is associated with RTZ latch operation. With respect to data stream 332, for example, data bit 0 of signal DATA is sampled at the rising edge of signal CLK, which activates data bit 0 of data stream 332. Activation of data bit 0 of data stream 332 is defined such that the output state of RTZ latch 308 is either at a valid logic low, or a valid logic high value. The valid logic output state of RTZ latch 308 is only held valid for one half cycle of signal CLK, i.e., one UI.

Upon the subsequent falling edge of signal CLK (and, therefore, the rising edge of signal $\overline{\text{CLK}}$), RTZ latch 308 resets and RTZ latch 310 activates its output state at the rising edge of signal $\overline{\text{CLK}}$ with the previously activated logic state of RTZ latch 308, e.g., data bit 0. Signal flow through RTZ latches 312-318 similarly propagates data bit 0 until finally, as an example at time slot 402, data bit 0 exists at the output of RTZ latch 318. Meanwhile, other "even" data bits, e.g., data bit 2, data bit 4, etc., are propagated through RTZ latches 308-318 as illustrated. It is recognized that time slot 402 represents a time period equal to one unit interval.

Similarly with respect to data stream 344, for example, data bit 1 of signal DATA is sampled at the rising edge of signal $\overline{\text{CLK}}$, which activates data bit 1 of data stream 344. Activation of data bit 1 of data stream 344 is defined such that the output state of RTZ latch 320 is either at a valid logic low, or a valid logic high value. The valid logic output state of RTZ latch 320 is only held valid for one half cycle of signal CLK, i.e., one UI.

Upon the subsequent falling edge of signal $\overline{\text{CLK}}$ (and, therefore, the rising edge of signal CLK), RTZ latch 320 resets and RTZ latch 322 activates its output state at the rising edge of signal CLK with the previously activated logic state of RTZ latch 320, e.g., data bit 1. Signal flow through RTZ latches 322-330 similarly propagates data bit 1 until finally, as an example, at the rising edge of signal CLK after time slot 402, data bit 1 exists at the output of RTZ latch 330. Meanwhile, other "odd" data bits, e.g., data bit 3, data bit 5, etc., are propagated through RTZ latches 320-330 as illustrated.

It is recognized that during time slot 402, half of RTZ latches 320-330 are activated and the other half are reset. In other words, reset RTZ latches 308, 312, 316, 322, 326, and 330 provide null, or zero, information at their output during time slot 402. The output of these reset latches, therefore, may be received directly by summer 304 without the need for any intervening logic, since they supply zero information and hence, have no effect on the output of summer 304.

Furthermore, for each RTZ latch 320-330 that is in a reset condition, the corresponding RTZ latch 308-318 is in an activated condition. For example, during time slot 402, RTZ latch 308 is in a reset condition, whereas its corresponding RTZ latch, e.g., RTZ latch 320, is in an activated condition. Similarly, RTZ latch 310 is in an activated condition, whereas its corresponding RTZ latch, e.g., RTZ latch 322, is in a reset condition. It can be seen that the reset/activated conditions similarly alternate for RTZ latches 312-318 and RTZ latches 324-330. Thus, during time slot 402, bits 0-5 are activated at the outputs of RTZ latches 318, 328, 314, 324, 310, and 320, respectively.

Time slot 402 represents a single UI in which operation of the DFE on, for example, data bit 6 of signal DATA takes place. In particular, it can be seen that the first rising edge of signal CLK subsequent to time slot 402, is responsible for sampling data bit 6 of signal DATA. Prior to sampling data bit 6, however, it is desired to correct data bit 6 using ISI information that is contained within the previously received consecutive data bits, e.g., data bits 0-5.

In this instance, data bits 0-5 are considered to be the consecutive logical post-cursor values to the current incoming data, e.g., currently received data bit 6. As such, appropriately signed and weighted post-cursor information is combined with the current cursor, such that any energy associated with data bits 0-5, i.e., ISI, that is present at data bit 6 may be subtracted/added from/to data bit 6. Thus, ISI relating to data bits 0-5 is substantially removed from data bit 6, prior to sampling data bit 6, by operation of DFE 216 as illustrated in FIG. 3. It should be noted, that the number of feedback taps may be increased as necessary to enhance ISI reduction. For example, a 10-bit tap structure may be implemented, whereby ISI due to the previously received 10 data bits may be removed from the current cursor.

By inspection of time slot 402 of the set/reset timing relationship of RTZ latches 308-330 as illustrated in FIG. 4, it can be seen that RTZ latches 310, 314, 318, 320, 324, and 328 are in their respective activated states. Conversely, RTZ latches 308, 312, 316, 322, 326, and 330 are in their respective reset states. Thus, data bits 0-5 of feedback data streams 342, 352, 338, 348, 334, and 344, respectively, are in their activated state, whereas the corresponding data bits of feedback data streams 332, 336, 340, 346, 350, and 354 are in their reset state. As such, data bits 0-5 are inherently activated by operation of RTZ latches 308-330 to implement the DFE of data bit 6. It can further be seen that for each time slot subsequent to time slot 402, data bits 1-6 are inherently activated to equalize currently received data bit 7; data bits 2-7 are inherently activated to equalize currently received data bit 8, and so on.

Figure 5:
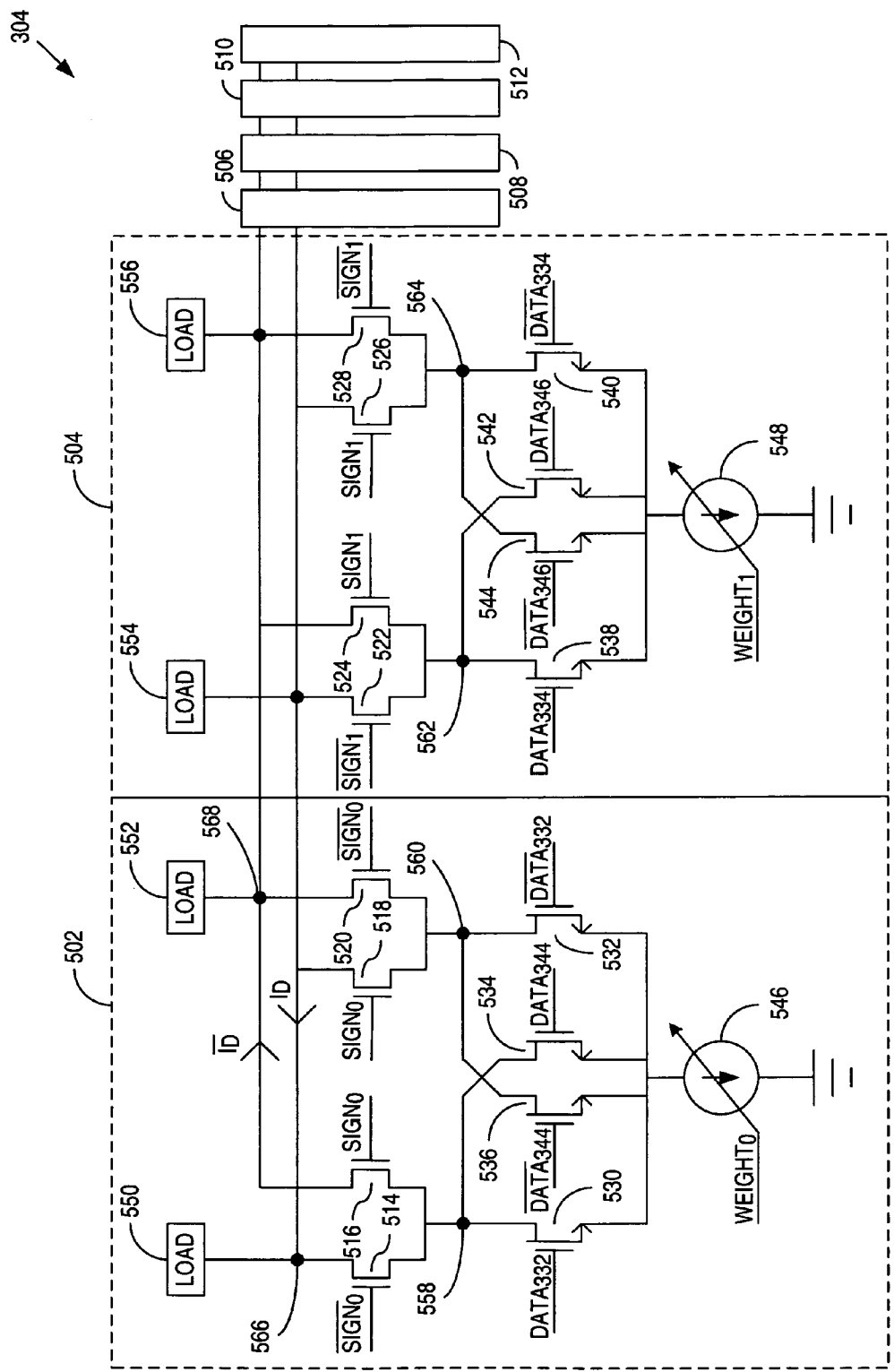
FIG. 5 illustrates an exemplary schematic diagram of a summing node of the DFE of FIG. 3.

Turning to FIG. 5, an exemplary schematic diagram of summer 304 of FIG. 3 is illustrated. Summation nodes 502 and 504 of summer 304 are shown in detail, whereas summation nodes 506-512 are represented in block notation. Summation node 502, for example, represents a summation of even data stream 332 with odd data stream 344 by differential transistor pairs 530/532 and 534/536, respectively. In addition, signal $SIGN_0$ and $WEIGHT_0$, as generated by SIGN block 356 of FIG. 3, is received by differential transistor pairs 516/514, 518/520, and current source/sink 546, respectively.

Similarly, summation node 504, for example, represents a summation of even data stream 334 with odd data stream 346 by differential transistor pairs 538/540 and 542/544, respectively. In addition, signal $SIGN_1$ and $WEIGHT_1$, as generated by SIGN block 356 of FIG. 3, is received by differential transistor pairs 524/522, 526/528, and current source/sink 548, respectively. Even data streams 336-342 and odd data streams 348-354, as well as signals $SIGN_2$-$SIGN_5$ and $WEIGHT_2$-$WEIGHT_5$, are similarly received by summing nodes 506-512.

In operation, differential transistor pairs 530/532, 534/536, 538/540, and 542/544 convert feedback data streams 332, 344, 334, and 346, respectively, into current signals. The current signals are generated at the drain terminals of their respective transistor pairs and are summed at nodes 558-564. Current conducted as a result of the voltage to current (V-I) conversion of one data bit of data stream 332, $DATA_{322}$, and one data bit of data stream 344, $DATA_{344}$, is conducted by transistor pairs 530/532 and 534/536, respectively. Similarly, current conducted as a result of the V-I conversion of one data bit of data stream 334, $DATA_{334}$, and one data bit of data stream 346, $DATA_{346}$, is conducted by transistor pairs 538/540 and 542/544, respectively.

Due to the connection between the output of RTZ latches 308,320 and 310,322 and the corresponding digital to analog conversion within summation nodes 502 and 504, the current conducted by current sources 546, $I_{546}$, and 548, $I_{548}$, is guaranteed to flow through one transistor of their respective differential transistor pairs at any given instant in time. As such, the amplitude and direction of current into nodes 558-564 stays within the appropriate operating region with the right correction.

As can be seen from the timing diagram of FIG. 4, transistor pairs 530/534, 532/536, 538/542, and 540/544 will normally not be in a simultaneous conductive state during any given UI, since by virtue of the RTZ shift register operation, even and odd data bits of corresponding data streams are not active at the same time. Corresponding data streams are those odd and even data streams that have been subjected to equivalent amounts of RTZ latch delay, such as data streams 332/344, 334/346, etc.

Given any UI, therefore, one of the odd/even data streams is in a reset condition, and the corresponding data stream is in an activated condition. Further, the data stream that is activated provides a data bit during one UI that is either at a logic high level, or at a logic low level. In a first logic state, therefore, one transistor of transistor pair, e.g., 530/532, is in a conductive state and one transistor of the corresponding transistor pair, e.g., 534/536, is in a reset condition. In a second logic state, the other transistor of transistor pair, e.g., 534/536, is in a conductive state and the other transistor of the corresponding transistor pair, e.g., 530/532, is in a reset condition.

Returning to FIG. 4, summation node 502 is operating in the second logic state during time slot 402, since signal $DATA_{332}$ is in a reset condition and signal $DATA_{344}$ is in an activated condition. The particular data bit within data stream 344, e.g., data bit 5, is either at a logic high level, or at a logic low level. Accordingly, either of transistors 534 or 536 is conductive, depending upon the logic state of data bit 5.

Thus, in the second logic state, either of transistors 534 or 536 are responsible for conducting current $I_{546}$ through nodes 558 or 560, respectively. In a first phase of the second logic state, for example, data bit 5 of data stream 344 is at a logic high value. Furthermore, if the logic state of signal $SIGN_0$ is at a logic high value and the logic state of signal $\overline{SIGN_0}$ is at a logic low value, thus rendering transistor 516 conductive and transistor 514 non-conductive, then the current conducted by load 552 increases by the magnitude of $I_{546}$ by virtue of the conductive state of transistor 534. Conversely, if the logic value of signal $SIGN_0$ is at a logic low value and the logic value of signal $\overline{SIGN_0}$ is at a logic high value, thus rendering transistor 514 conductive and transistor 516 non-conductive, then the current conducted by load 550 increases by the magnitude of $I_{546}$ by virtue of the conductive state of transistor 534. Hence, a signed operation in the first phase of the second logic state is facilitated.

In a second phase of the second logic state, for example, data bit 5 of data stream 344 is at a logic low value. Furthermore, if the logic state of signal $SIGN_0$ is at a logic high value and the logic state of signal $\overline{SIGN_0}$ is at a logic low value, thus rendering transistor 518 conductive and transistor 520 non-conductive, then the current conducted by load 550 increases by the magnitude of $I_{546}$ by virtue of the conductive state of transistor 536. Conversely, if the logic state of signal $SIGN_0$ is at a logic low value and the logic state of signal $\overline{SIGN_0}$ is at a logic high value, thus rendering transistor 520 conductive and transistor 518 non-conductive, then the current conducted by load 552 increases by the magnitude of $I_{546}$ by virtue of the conductive state of transistor 536. Hence, a signed operation in the second phase of the second logic state is facilitated.

It should be noted that signal $WEIGHT_0$, as generated by SIGN block 356 of FIG. 3, controls the magnitude of current $I_{546}$. In such an instance, the magnitude of the voltage drop across loads 550 and 552 is controlled by signal $WEIGHT_0$. Accordingly, the variation in output voltage at nodes 566 and 568 of summing node 502 in response to the odd and even feedback data streams, 332 and 344, respectively, may be controlled. Similarly, each of summing nodes 504-512 have identical connections at nodes 566 and 568 to complete the summation of even data streams 344-342 and odd data streams 346-354.

Operation of summing nodes 504-512 is identical to the operation of summing node 502 as discussed above. As such, it can be seen that the current conducted through loads 550, 554, and the other loads (not shown) in summing nodes 506-512 that connect to node 566, affects the magnitude of the output voltage of summer 304 at node 566. Similarly, the current conducted through loads 552, 556, and the other loads (not shown) in summing nodes 506-512 that connect to node 568, affects the magnitude of the output voltage of summer 304 at node 568.

It should be noted that loads 550,552 and 554,556 may be replaced with current sources having a magnitude equal to half of the $WEIGHT_0$ and $WEIGHT_1$ magnitudes, respectively. That is to say, for example, that the magnitudes of current sources 550 and 552 may be scaled to be equal to one half of the magnitude of current source 546 and the magnitudes of current sources 554 and 556 may be scaled to be equal to one half of the magnitude of current source 548.

Figure 6:
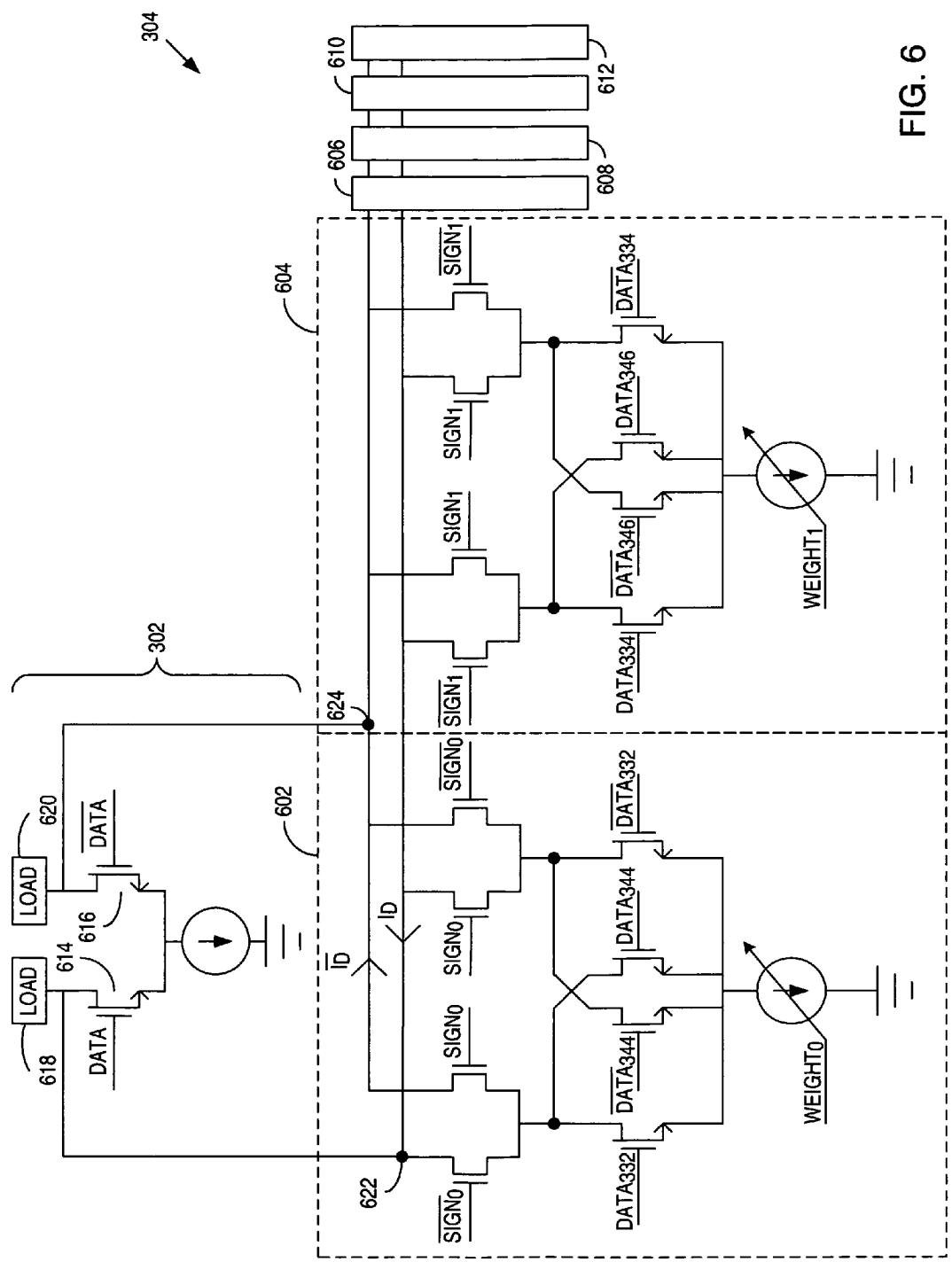
FIG. 6 illustrates an exemplary schematic diagram of an alternate summing node of the DFE of FIG. 3.

In an alternate embodiment, loads 550-556 and the loads (not shown) in summing nodes 506-512 may be removed altogether and replaced with differential amplifier 302 as exemplified in FIG. 6. Differential amplifier 302 may be implemented with transistors 614 and 616, loads 618 and 620, and the current source/sink, where loads 618 and 620 may either be passive or active.

In operation, the 6-tap summation current $I_D$ and the 6-tap summation current $\bar{i}_D$ is summed at loads 618 and 620 with the current conducted by transistors 614 and 616 in response to input data signal DATA and $\overline{DATA}$. As such, the output voltage generated at nodes 622 and 624 from differential amplifier 302, represents the equalized signal for the currently received data bit, since the 6-tap summation currents, in summation nodes 602-612, have been appropriately signed and weighted to appropriately equalize the currently received data bit.

Note that processing delay is significantly reduced by taking advantage of the timing relationships of the odd and even data streams as exemplified in FIG. 4 in combination with the feed back circuitry of FIG. 5. First, the appropriate feedback taps are inherently activated at each UI to correct the currently received bit. Taking time slot 402, for example, data bits 0-5, are inherently activated by RTZ latch operation and immediately summed to correct data bit 6 without any further data processing being necessary. That is to say, for example, that not only are the feedback taps used to correct the currently received data bit inherently activated, but the feedback taps that are not used for data bit correction are also inherently deactivated. Thus, no additional logic is necessary to select between the activated and deactivated feedback taps, which substantially decreases the feedback processing time required.

Next, the feedback voltage is converted to current by operation of the current steering networks of summation nodes 602-612 as discussed above. Next, the feedback current is summed with current generated as a result of the currently received data bit by operation of differential amplifier 302. Finally, the summed current is conducted by loads 618 and 620 to convert the summed current back into voltage at the full-rate. Thus, through inherently activated feedback and current mode mixing, the feedback taps may be immediately summed to implement a parallel to serial conversion, so that each data bit received may be corrected at the full rate prior to sampling.

Figure 7:
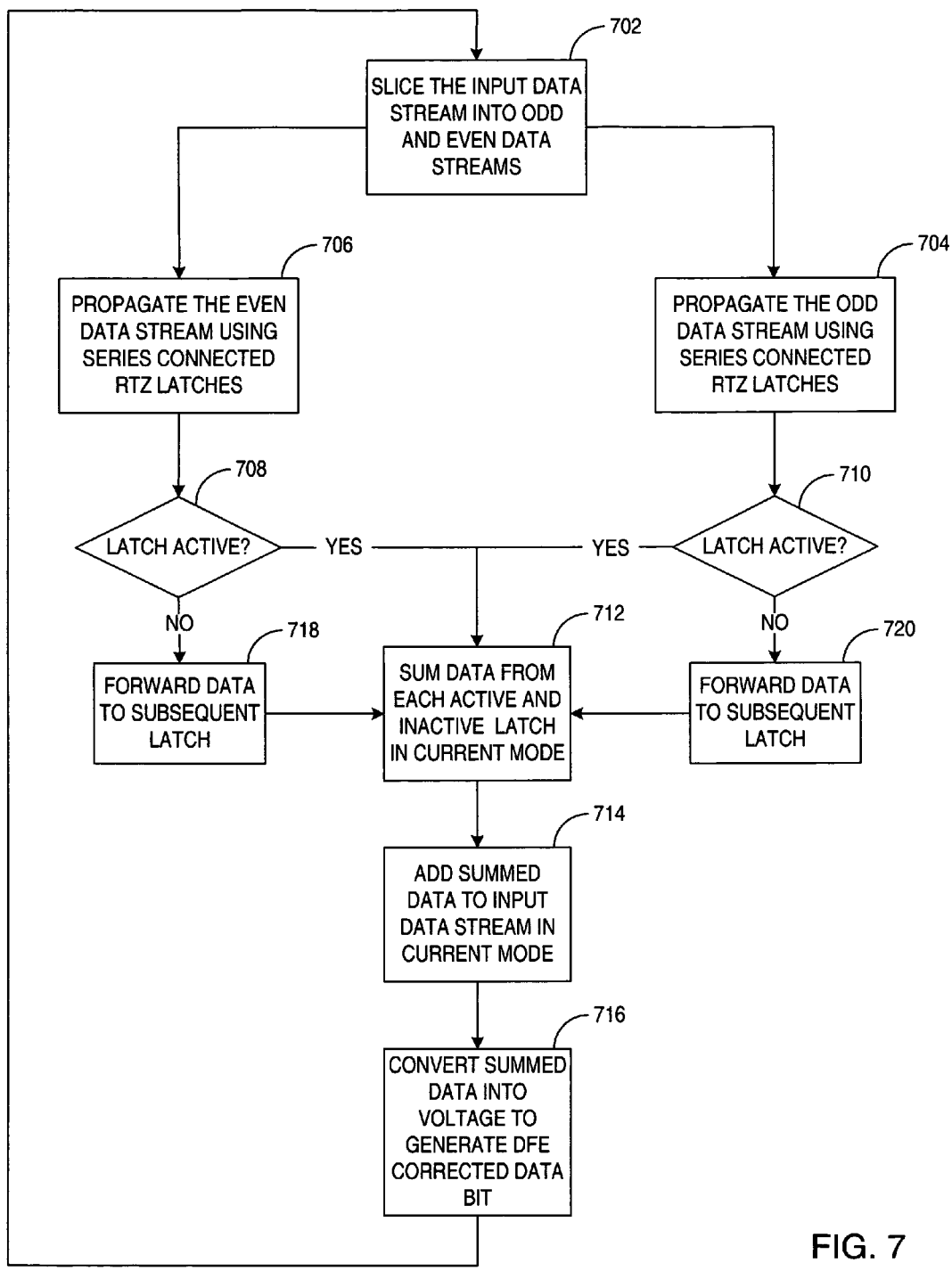
FIG. 7 illustrates an exemplary flow diagram of a high speed DFE algorithm.

Turning to FIG. 7, flow diagram 700 is presented, in which an exemplary method of performing high speed DFE is illustrated and explained in relation to FIGS. 3 and 4. In step 702, an input data stream running at full rate is sliced into odd and even data streams. For example, the full rate data stream, DATA, is sliced into an even data stream by RTZ latch 308 and the full rate data stream, DATA, is sliced into an odd data stream by RTZ latch 320. In particular, the even data stream is generated at the rising edge of signal CLK to latch all even data bits at RTZ latch 308. The odd data stream, on the other hand, is generated at the rising edge of signal $\overline{CLK}$ to latch all odd data bits at RTZ latch 320.

The even data bits are then propagated through the remaining RTZ latches 310-318 through use of either the rising edge of signal CLK or the rising edge of signal $\overline{CLK}$ as in step 706. In particular, even data bits are latched by the rising edge of signal CLK at RTZ latches 312 and 316, while even data bits are latched by the rising edge of signal $\overline{CLK}$ at RTZ latches 310, 314, and 318. Likewise, odd data bits are propagated through the remaining RTZ latches 322-330 through use of either the rising edge of signal CLK or the rising edge of signal $\overline{CLK}$ as in step 704. In particular, odd data bits are latched by the rising edge of signal $\overline{CLK}$ at RTZ latches 324 and 328, while odd data bits are latched by the rising edge of signal CLK at RTZ latches 322, 326, and 330.

In steps 708 and 710, RTZ latches 308-330 are either in an active state, or they are in an inactive state. For example, time slot 402 depicts an exemplary UI, in which RTZ latches 308, 312, 316, 322, 326, and 330 are inactive and RTZ latches 310, 314, 318, 320, 324, and 328 are active. If inactive, then the RTZ latch first propagates its latched data bit to the subsequent RTZ latch as in steps 718 and 720. For example, data bit 4 propagates from RTZ latch 308 to RTZ latch 310 at the rising edge of signal $\overline{CLK}$, while RTZ latch 308 deactivates its output at the falling edge of signal CLK. Similarly, data bit 3 propagates from RTZ latch 322 to RTZ latch 324 at the rising edge of signal $\overline{CLK}$, while RTZ latch 322 deactivates its output at the falling edge of signal CLK.

Regardless of whether the RTZ latch is activated or deactivated, each output of RTZ latches 308-330 are summed as discussed above in relation to FIGS. 5 and 6. Since RTZ latches 308, 312, 316, 322, 326, and 330 are inactive during UI 402, for example, their respective outputs may be directly summed with the outputs of RTZ latches 310, 314, 318, 320, 324, and 328 without the need for intervening logic. Rather, since RTZ latches 308, 312, 316, 322, 326, and 330 provide zero information during UI 402, their outputs may be directly summed with the outputs of RTZ latches 310, 314, 318, 320, 324, and 328 as in step 712. Further, all activated RTZ latch outputs are properly signed, weighted, and summed in current mode, as discussed above in relation to FIGS. 5 and 6, to implement a parallel to serial conversion of the feedback signals.

Once the feedback signals have been properly signed, weighted, and summed, they may be added in current mode to the currently received input data bit at the full rate as in step 714. Once the currently received input data bit is corrected in current mode, it may then be converted to voltage, as in step 716, prior to sampling. For example, the rising edge of signal CLK, immediately subsequent to UI 402, is used to sample data bit 6. By then, however, previously received data bits 0-5 have been used to substantially rid data bit 6 of ISI that was contributed by data bits 0-5. Once sampled, the process repeats to correct subsequently received data bits.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of performing decision feedback equalization (DFE) of a currently received data bit, comprising:
    slicing an input data stream into first and second data streams using first and second shift registers;
    shifting the first data stream through first and second sets of latches of the first shift register, wherein the first set of latches of the first shift register is activated during a time period and the second set of latches of the first shift register is reset during the time period;
    shifting the second data stream through first and second sets of latches of the second shift register, wherein the first set of latches of the second shift register is reset during the time period and the second set of latches of the second shift register is activated during the time period;
    directly connecting, with no intervening logic, all outputs of each of the first and second sets of latches of the first and second shift registers to a summer; and
    simultaneously summing, with the summer, all outputs of each of the first and second sets of latches of the first and second shift registers with the currently received data bit during the time period, wherein the activated latches provide a number of consecutively received data bits prior to the currently received data bit for summation during the time period.

2. The method of claim 1, wherein shifting the first data stream comprises:
    clocking the first set of latches of the first shift register with a first clock signal and
    clocking the second set of latches of the first shift register with a second clock signal.

3. The method of claim 2, wherein the second clock signal comprises an inverted first clock signal.

4. The method of claim 3, wherein shifting the second data stream comprises:
    clocking the first set of latches of the second shift register with the second clock signal; and
    clocking the second set of latches of the second shift register with the first clock signal.

5. The method of claim 4, wherein either the first data stream is an even data stream and the second data stream is an odd data stream or the first data stream is an odd data stream and the second data stream is an even data stream.

6. The method of claim 1, wherein simultaneously summing, with the summer, all outputs of each of the first and second sets of latches of the first and second shift registers with the currently received data bit comprises converting the outputs of the activated latches into first and second current signals.

7. The method of claim 6, wherein simultaneously summing, with the summer, all outputs of each of the first and second sets of latches of the first and second shift registers with the currently received data bit further comprises converting the currently received data bit into a third current signal.

8. The method of claim 7, wherein simultaneously summing, with the summer, all outputs of each of the first and second sets of latches of the first and second shift registers with the currently received data bit further comprises summing the first and second current signals with the third current signal.

9. The method of claim 8, wherein simultaneously summing, with the summer, all outputs of each of the first and second sets of latches of the first and second shift registers with the currently received data bit further comprises converting the summed current signals into a voltage signal, the voltage signal being indicative of an equalized currently received data bit.

10. A decision feedback equalizer (DFE), comprising:
    a first shift register coupled to receive an input data stream and coupled to provide a first portion of previously received data bits, wherein a first group of data bits of the first portion are activated and a second group of data bits of the first portion are reset;
    a second shift register coupled to receive the input data stream and coupled to provide a second portion of the previously received data bits, wherein a first group of data bits of the second portion are activated and a second group of data bits of the second portion are reset; and
    a summation block coupled to receive the input data stream and directly coupled, with no intervening logic, to the first and second shift registers and adapted to sum a currently received data bit of the input data stream with the first and second portions of the previously received data bits, wherein the summation block is adapted to simultaneously combine all outputs of the first and second shift registers to form a group of consecutive data bits received prior to the currently received data bit.

11. The DFE of claim 10, wherein the summation block comprises a plurality of summing nodes, each summing node including,
    a first pair of transistors coupled to the first shift register and coupled to receive a first pair of data bits, the first pair of transistors adapted to convert the first pair of data bits into a first current signal; and
    a second pair of transistors coupled to the second shift register and coupled to receive a second pair of data bits, the second pair of transistors adapted to convert the second pair of data bits into a second current signal.

12. The DFE of claim 11, wherein a first transistor of the first pair of transistors and a first transistor of the second pair of transistors are coupled together at a first node.

13. The DFE of claim 12, wherein a second transistor of the first pair of transistors and a second transistor of the second pair of transistors are coupled together at a second node.

14. The DFE of claim 13, further comprising a third pair of transistors coupled to the first node and coupled to receive a first sign signal, wherein a conductivity state of the third pair of transistors is controlled by the first sign signal.

15. The DFE of claim 14, further comprising a fourth pair of transistors coupled to the second node and coupled to receive the first sign signal, wherein a conductivity state of the fourth pair of transistors is controlled by the first sign signal.

16. The DFE of claim 15, further comprising:
    a first load coupled to the first and second nodes to conduct the first and second current signals; and
    a second load coupled to the first and second nodes to conduct the first and second current signals.

17. The DFE of claim 15, further comprising a differential amplifier having an output coupled to the first and second nodes and coupled to receive the currently received data bit, the differential amplifier adapted to convert the currently received data bit into a third current signal and further adapted to sum the first, second, and third current signals at the output of the differential amplifier.

18. A method of performing decision feedback equalization (DFE), comprising:
- propagating a first portion of input data bits through a first plurality of latches;
- propagating a second portion of the input data bits through a second plurality of latches;
- resetting a first group of the first and second plurality of latches during a time period;
- activating a second group of the first and second plurality of latches during the time period;
- directly connecting, with no intervening logic, all outputs of the first and second plurality of latches to a summer;
- simultaneously combining, with the summer, all outputs of the first and second groups of latches during the time period; and
- summing, with the summer, a currently received input data bit with the simultaneously combined outputs during the time period to equalize a currently received input data bit.

19. The method of claim 18, wherein resetting the first group of the first and second plurality of latches comprises providing zero information from the first group of the first and second plurality of latches.

20. The method of claim 19, wherein activating the second group of the first and second plurality of latches comprises providing information relating to a group of consecutive data bits received prior to the currently received input data bit.

* * * * *

UNITED STATES PATENT AND TRADEMARK OFFICE
CERTIFICATE OF CORRECTION

PATENT NO. : 7,668,238 B1
APPLICATION NO. : 11/299975
DATED : February 23, 2010
INVENTOR(S) : Shahriar Rokhsaz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Seventh Day of December, 2010

David J. Kappos
*Director of the United States Patent and Trademark Office*